Dec. 23, 1941.  T. IAVELLI  2,267,464
MOTOR VEHICLE POWER TRANSMISSION
Filed Aug. 28, 1940  3 Sheets-Sheet 1
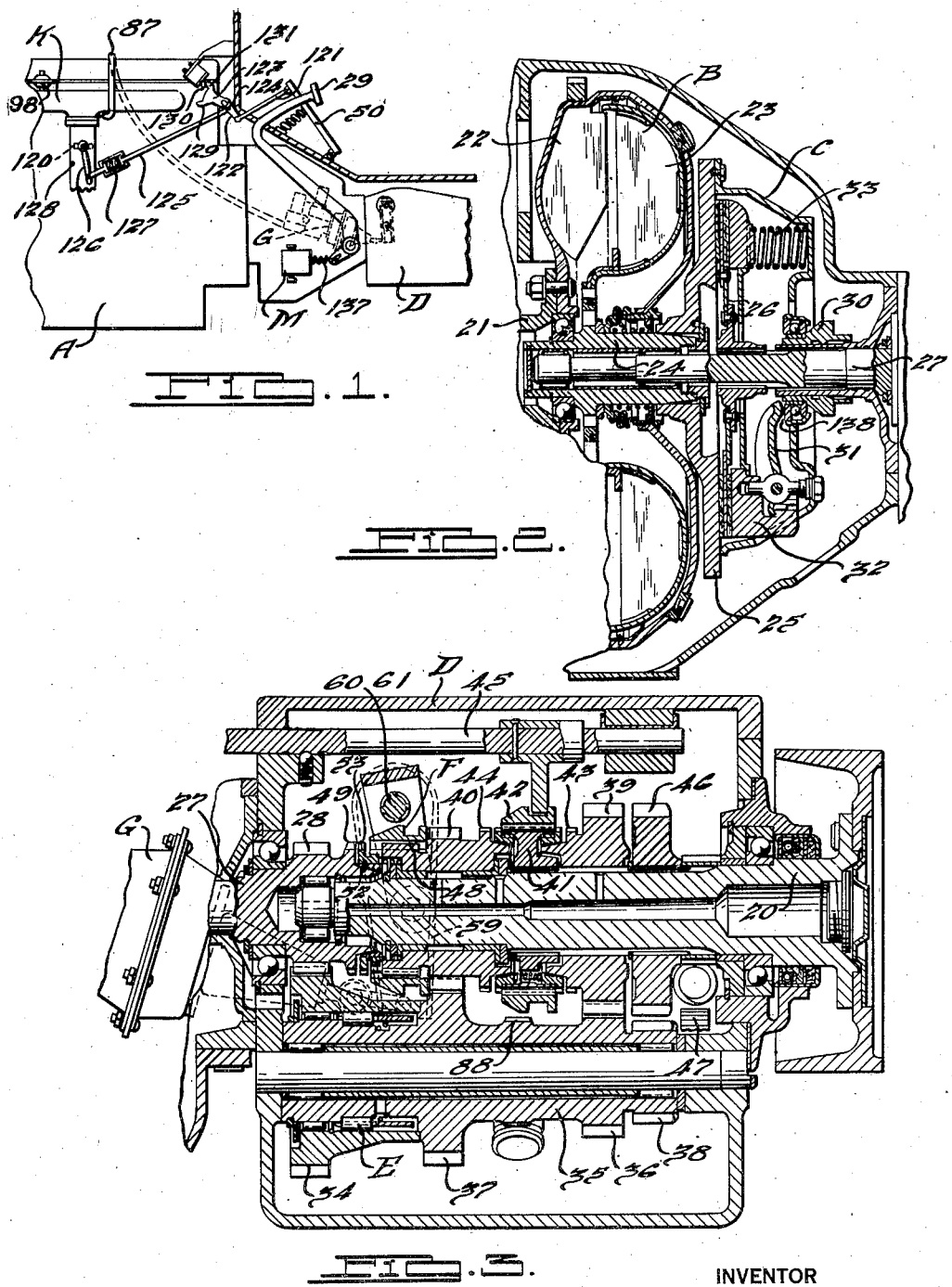
INVENTOR
Teno Iavelli.
BY
ATTORNEYS

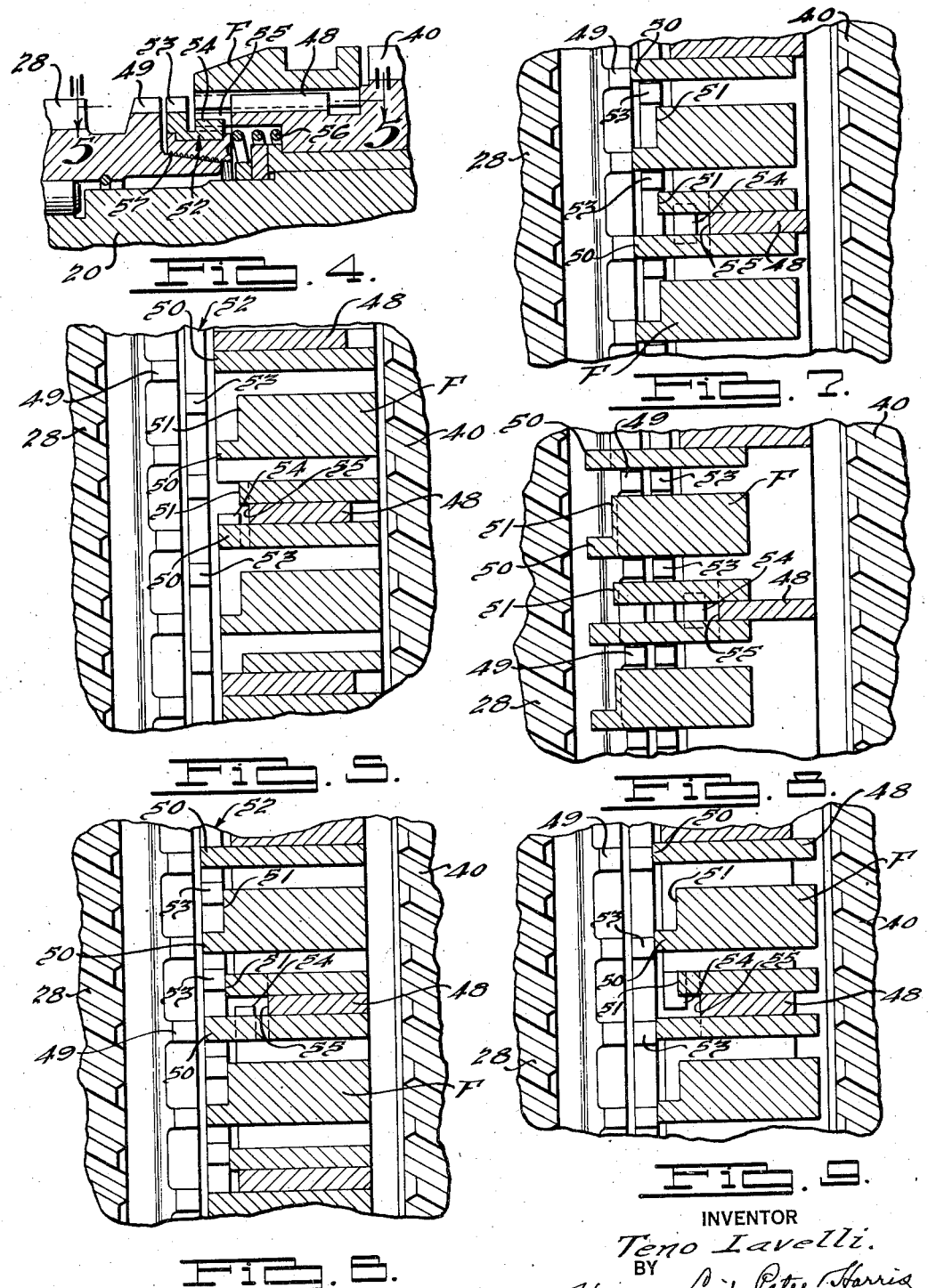

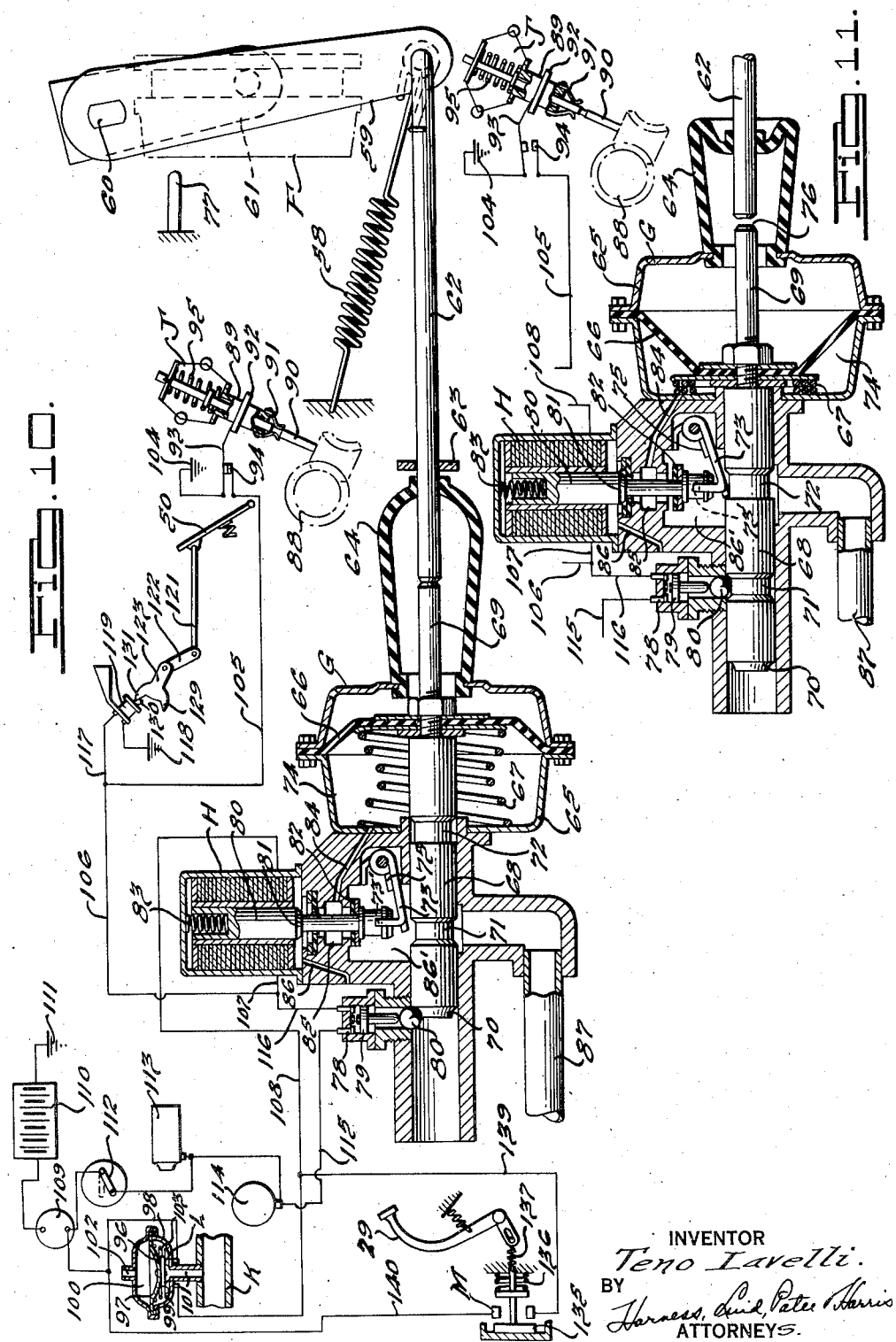

Patented Dec. 23, 1941

2,267,464

UNITED STATES PATENT OFFICE 2,267,464

MOTOR VEHICLE POWER TRANSMISSION

Teno Iavelli, Detroit, Mich., assignor to Chrysler Corporation, Highland Park, Mich., a corporation of Delaware Application August 28, 1940, Serial No. 354,537

19 Claims. (Cl. 192—.01)

This invention relates to motor vehicles and refers more particularly to power transmission and control mechanism therefor.

In certain types of automatic and semi-automatic transmissions such as shown and described in the copending application of Carl A. Neracher et al., Serial No. 335,310, filed May 15, 1940, by way of example, it is possible under rather unusual conditions to so manipulate the vehicle that the transmission becomes locked up in a shift position; also to render the ignition system inoperative at an undesired time. While the aforesaid unusual conditions would not ordinarily occur, it happens that once in a while a driver of a vehicle equipped with this type of transmission system does experience these difficulties and while said application discloses means to release a locked-up transmission and to restore the ignition system it is nevertheless desirable to insure against the occurrence of the undesirable difficulties in the first place.

In the application of William T. Dunn, Serial No. 354,512, filed August 28, 1940, there is disclosed an arrangement seeking to overcome the undesirable difficulties but under certain conditions which are unusual but nevertheless likely to occur, the difficulties may still arise.

It is an object of my invention to provide means for overcoming the aforesaid difficulties, my invention operating automatically without attention on the part of the driver.

Another object of my invention is to provide means insuring against undesired grounding of the engine ignition in connection with transmission systems employing ignition grounding means for momentary relief of torque between positively engaging drive control elements whereby such elements may be readily relatively separated to release a drive in the transmission. Such systems are especially desirable where change in speed ratio drive is to be made while the engine is delivering power by releasing the positive drive control elements which may be the elements of a positive clutch.

A further object of my invention is to provide means for preventing a transmission from getting into an undesired locked-up or no-back condition in which the driver cannot manipulate the transmission. Such condition frequently arises in connection with transmissions employing an overrunning clutch in the line of drive and especially when the car tends to roll backwards down hill and the shift lever is set for forward drive.

Another object of my invention is to provide control means for modifying the action of transmission control systems under conditions where the driver brings the car to a stop with the engine ignition system turned off prematurely. Under such conditions, especially for transmission systems embodying governor control of electrical solenoids or other devices, the drive control elements do not properly respond to the main transmission control and either the speed ratio change does not take place as desired or the transmission becomes locked-up or the ignition grounded or several or all of these undesired conditions are brought into action at the same time. My invention insures against the occurrence of these undesired conditions.

Further objects and advantages of my invention will be more apparent from the following illustrative embodiment thereof, reference being had to the accompanying drawings in which:

Fig. 1 is a side elevational view showing a motor vehicle engine and power transmission equipped with my invention.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Fig. 11 is a similar view of a portion of the Fig. 10 control mechanism in another operating position.

While my control may be employed in conjunction with various types and arrangements of motor vehicle transmissions, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50 thereby closing the engine throttle valve and allowing the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 10 and 11, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a leader rod 68 which has a rear extension 69 aligned with rod 62.

Rod 68 has a series of detents 70, 71 and 72, the latter cooperating with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the distributer of the ignition system whereby the engine ignition may be momentarily rendered ineffective thereby unloading the torque at sleeve F sufficiently to insure its release by spring 67. This ignition interrupting system is under control of an interrupter switch 78 which is closed by plunger 79 and ball 80 whenever rod 69 moves between the Fig. 10 and Fig. 11 positions by reason of the enlarged rod portion between detents 70, 71. Detent 71 is so arranged that, with the parts as in Fig. 11 and sleeve F clutched, rod 68 may move rearwardly sufficiently to close gap 76 at the lost-motion between rod portion 69 and rod 62, this movement causing switch 78 to close and ground the ignition system whereupon spring 67 may then cause further movement of rod 68 and rod 62 to release sleeve F, the switch 78 then opening by detent 70 to restore the ignition system.

The vacuum supply to chamber 74 is under control of solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseat valve 81 so as to vent this chamber through passage 84, chamber 85 and vent passage 86. When the solenoid is de-energized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferably to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the break-away being under control of a detent 91 if desired.

The sleeve 89 has a shoulder 92 engaged by the swinging switch piece 93 of the governor switch 94. When the car is stationary the detent 91 is engaged and switch 94 is closed. As the car accelerates the governor eventually reaches its critical speed and detent 91 releases thereby causing switch 94 to open. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at approximately 7 and 15 M. P. H. (miles per hour), the switch 94 closing on stopping the car in direct and second at approximately 7 and 3 M. P. H. respectively.

In order to prevent undesired deenergization of the solenoid H with attendant latching of piston 66 and clutching of sleeve F when the car is stopped as would occur in the event the driver brings the car to a stop, especially on an upgrade, while prematurely shutting off the engine ignition and leaving the sleeve 42 shifted in one of its forward drive positions, there is provided some means to maintain the piston 66 against such undesired latching. In Fig. 10 this means comprises the vacuum switch L, as set forth in said Dunn application, this switch being interposed in a circuit containing the governor switch 94 and solenoid H such that as long as there is an appreciable vacuum in the intake manifold K then the solenoid will remain energized independently of the ignition switch.

The switch L is controlled by a movable conductor 96 carried by a diaphragm 97 which divides casing 98 into two chambers 99 and 100. Chamber 99 is in continuous communication at 101 with manifold K, and chamber 100 is vented to the atmosphere at 102. A light spring 103 raises conductor 96 upwardly so as to open switch L when the vacuum in manifold K has fallen so low that it would be ineffective to operate piston 66.

The governor solenoid circuit under control of switches 94 and L in series, comprises ground 104 to switch 94 thence through conductors 105, 106 and 107 to solenoid H thence by conductor 108 to switch L, ammeter 109, battery 110 and ground 111.

In Fig. 10 I have illustrated a portion of the engine ignition circuit which extends from battery 110 and ammeter 109 to ignition switch 112 thence to coil 113 and distributer 114.

The ignition grounding circuit for rendering the ignition momentarily inoperative comprises a grounding conductor 115 extending to ignition interrupter switch 78 thence by conductor 116 to conductor 106 which has a branch 117 extending to ground 118 under control of a switch 119 called the kick-down switch because it is controlled by the accelerator pedal 50 when fully depressed to effect step-down in the transmission speed ratio.

The kick-down solenoid circuit extends from ground 118 through switch 119 and conductors 117, 106 and 107 through solenoid H and thence through switch L to ground 111 just as for the governor solenoid circuit.

The kick-down switch 119 is preferably closed when the engine throttle valve 120 (Fig. 1) is fully open. This may be accomplished by arranging the accelerator pedal 50 for a movement overtravelling its wide open throttle position. Pedal 50 operates a link 121 so as to swing bell crank lever 122, 123 about its pivot 124. Lever arm 122 operates link 125 which is connected to throttle valve lever 126 through a lost motion spring 127. Ordinarily this spring affords a solid connection between link 125 and lever 126 but when pedal 50 is depressed to cause lever 126 to engage stop 128 at wide open throttle, then further depression of pedal 50 will cause finger 129 of lever arm 123 to throw arm 130 of switch 119 upwardly thereby closing switch 119, the spring 127 yielding to accommodate this overtravelling movement of the accelerator pedal. When the pedal is released, then finger 131 restores switch 119 to open the kick-down solenoid circuit.

In the operation of the mechanism, the car at standstill and with the ignition switch 112 closed and the engine idling will cause the solenoid H to be energized as in Fig. 10 because governor switch 94 is closed and vacuum in manifold K will cause switch L to be closed thereby establishing the governor solenoid circuit. Cylinder 74 is vented and sleeve F disengaged. The driver shifts sleeve 42 to either the high or low range and accelerates the car ordinarily above the critical speed of governor J thereby causing switch 94 to open. As vacuum builds up in the engine intake manifold K, plunger 80 now being lowered by spring 83 because switch 94 is open, piston 66 will be operated by vacuum thereby moving rod 68 to its Fig. 11 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, switch 119 closes thereby energizing the kick-down solenoid circuit and causing solenoid H to raise plunger 80 and release latch 73 thereby venting chamber 74. At this time the sleeve F is under driving torque from the engine operating under wide open throttle. However, when latch 73 is released, spring 67 operates rod 68 rearwardly sufficiently to close gap 76 thereby closing the interrupter switch 78 and grounding the engine ignition system. This relieves the torque at sleeve F and spring 67 operates to release the sleeve whereupon the ignition is restored at detent 70 and the engine quickly speeds up to engage overrunning clutch E for establishing the third or first driving ratio depending on the setting of sleeve 42 prior to the kick-down operation.

On bringing the car to a stop when sleeve F is clutched as in fourth for example, the vacuum switch *l* insures release of sleeve F especially in the event that the engine ignition is turned off at switch 112 prior to bringing the car to rest.

Heretofore, without the vacuum switch or the equivalent thereof, the ignition switch 112 was in series with both the governor solenoid and the kick-down solenoid circuits with the result that if the car, when in fourth, was brought to rest with the ignition switch open, then the engine would be driven as a pump by the car and with the solenoid deenergized, the engine turning over would cause sufficient vacuum at the chamber 74 to cause piston 66 to operate and to latch as in Fig. 11 even though the sleeve F is then released. Then on stopping the car a slight backward roll of the car would cause blocker 52 to move just enough to unblock the sleeve and allow the latter to move forwardly by spring 58 and clutch with teeth 49. The effect is especially noticeable on stopping the car on an upgrade, such condition giving rise to the backward roll and undesired clutching of sleeve F in the stopped position of the car. Now with sleeve F engaged and the gear shifter set for high range (sleeve 42 clutched with teeth 44) where it is normally left until leaving the car, the backward roll produces a locked-up effect in the transmission making it impossible to shift sleeve 42 out of its clutched position. This is occasioned by the car attempting to establish drives in two different ratios in the transmission, one drive being from gear 40 directly to pinion 28 and the other being also between pinion 90 and gear 109 but through gear 96 clutch E and gear 106. The result is to hold the car against movement and to load the teeth of sleeve 42 in the shifted position. Now if the driver attempts to drive the car forwardly he naturally closes the ignition switch to start the engine but the engine will not start because the ignition system will ground and the car remains stalled. The ignition grounds because under the assumed conditions the rods 69 and 62 are positioned as in Fig. 11 on stopping the car so that as soon as the ignition switch is closed the solenoid H is energized through the governor solenoid circuit and rod 69 moves to take up gap 76 thereby holding interrupter switch 78 closed because sleeve F being loaded by backward roll tendency of the car cannot release by spring 67. Of course if the car is stopped without first turning off the ignition then governor switch 94 closes and solenoid H is energized thereby maintaining chamber 74 vented and allowing spring 67 to release sleeve F when the torque becomes very low as it does just before the car comes to rest. The trouble heretofore arises therefore in allowing the vacuum to operate in chamber 74 as the car is brought to rest, as in turning off the ignition such that the governor switch cannot establish its circuit to the solenoid and prevent latching of the piston. Some drivers have a habit of turning off the engine ignition when they are approaching the point where they are going to park the car, allowing the car to coast to a stop and the difficulties heretofore arise with some frequency under such conditions.

The foregoing difficulties have been largely automatically remedied by the vacuum switch L, as set forth in said Dunn application. Assuming that the car is stopped in fourth and the ignition switch 112 is left closed as it ordinarily is, then, as the governor switch 94 closes, the solenoid H is raised and chamber 74 vented thereby insuring release of sleeve F as before. Under such conditions switch L remains closed as the engine is running and diaphragm 97 is operated by vacuum in manifold K. Now let it be assumed that the car is driving in fourth and the driver opens switch 112 and brings the car to rest on an upgrade, leaving sleeve 42 shifted forwardly. As the car approaches a stop, the engine will not operate under its own power but will nevertheless be driven through transmission D, clutch C and fluid coupling B so that it will act as a pump and maintain vacuum in manifold K. This vacuum maintains switch L closed and as the governor switch 94 closes on car deceleration the solenoid H is maintained energized, chamber 74 is maintained vented, and piston 66 is prevented from becoming latched. Furthermore, spring 103 is very light and will respond to a slight degree of vacuum in the manifold so that when the vacuum finally falls to the point where switch L opens to deenergize the solenoid H and allow plunger 80 to lower, then the vacuum is not sufficient to operate piston 66 to its latched position. The intention therefore is to insure that the car will always be brought to a stop with sleeve F disengaged thus preventing the transmission lock-up, insuring against interrupter switch 78 undesirably grounding the engine ignition, and insuring the next acceleration of the car in a favorable torque multiplying ratio which is third if sleeve 42 is left in its position of forward shift.

While the arrangement hereinbefore described will overcome the difficulties in most instances, it will be noted that the controlling operation of the vacuum switch L, under the particular circumstances aforesaid, depends on the car driving the engine as a pump, thereby insuring the engine producing sufficient vacuum in manifold K that the vacuum switch L will be closed. In some transmission systems, as in that illustrated in my drawings, it is possible to break the drive from the car to the engine, as by depressing pedal 29 to release clutch C, while bringing the car to rest on an upgrade with the ignition shut off. Some drivers have a habit of depressing both the clutch and brake pedals in bringing the car to rest and if the clutch pedal is depressed under such conditions it will defeat the purpose of the vacuum switch L because the engine will quickly come to a stop in advance of bringing the car to rest and atmospheric pressure will be in manifold K as ordinarily the intake manifold is open through the customary carburetor and air cleaner to the atmosphere. This will allow the solenoid to be deenergized by breaking the governor solenoid circuit and, under the conditions noted, the car may stop with sleeve F clutched under torque and the engine ignition grounded out.

In order to overcome the possibility of nullifying the effect of the vacuum switch under the conditions aforesaid, I have provided what may be called a clutch pedal switch M controlled by a conductor 135 normally held in its Fig. 10 switch-open position by a spring 136 when pedal 29 is fully released. This pedal is operably connected to conductor 135 through a suitable lost-motion means as a spring 137 which allows the conductor to open switch M when the pedal is released but which acts in tension to close the switch as soon as pedal 29 is depressed, the switch staying closed during the clutch releasing stroke of pedal 29 by accommodation of spring 137. Preferably the arrangement is such that the switch M closes as pedal 29 takes up the usual clearance prior to operating the clutch release levers 31, this clearance being designated at 138 in Fig. 2 between the levers and the throw-out collar 30. Likewise switch M will then open after full engagement of clutch C when pedal 29 is released.

The switch M is connected by conductors 139 and 140 between ammeter 109 and conductor 108 to solenoid H so that it is in parallel with the vacuum switch L and will function just as described for switch L insofar as control on solenoid H is concerned. Therefore, if the driver should bring the car to rest on an upgrade with the ignition prematurely turned off and with pedal 29 depressed and sleeve 42 left in either of its forward drive positions, switch M will remain closed and will immediately take over the functions of switch L so that even though switch L opens, the switch M will maintain the solenoid energized and prevent car stopping with sleeve F clutched. If during this car deceleration, the pedal 29 is released to engage clutch C, then the engine will resume its drive from the car through clutch C and sufficient vacuum will be restored to manifold K to cause switch L to close.

While I have described the conditions attendant to stopping the car in fourth, it will be apparent that the same circumstances arise in stopping the car in second because in each instance the sleeve F is clutched prior to slowing down the car to where the governor switch 94 closes and in each instance sleeve 42 is clutched for a forward drive.

I claim:

1. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; means operable in response to operation of the engine by reason of the engine being driven by the vehicle, when said ignition control switch is open and said clutch is engaged, for controlling energization of said electrically operating means; and means operable in response to operation of said clutch releasing means for controlling energization of said electrically operating means independently of said energization control by the last said means.

2. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; means operable in response to operation of the engine by reason of the engine being driven by the vehicle, when said ignition control switch is open and said clutch is engaged, for controlling energization of said electrically operating means; means operable in response to operation of said clutch releasing means for controlling energization of said electrically operating means independently of said energization control by the last said means; and means operably responsive to predetermined vehicle driving speed for controlling energization of said electrically operating means in conjunction with each of said energization controlling means.

3. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; and electrical circuit-forming means for controlling operation of said electrically operating means independently of opening and closing of said ignition control switch, comprising, a speed-responsive switch, means for opening and closing the speed-responsive switch in response to predetermined driving speed of the vehicle, and a pair of parallel arranged circuit controlling means respectively operable in response to operation of the engine when driven by the vehicle and in response to operation of said clutch releasing means.

4. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; means dependent on operation of the engine when the engine is driven by the vehicle, with said ignition control switch open, for controlling energization of said electrically operating means; and means operable in response to operation of said clutch releasing means for controlling energization of said electrically operating means independently of said energization control by the last said means.

5. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; means dependent on operation of the engine when the engine is driven by the vehicle, with said ignition control switch open, for controlling energization of said electrically operating means; means operable in response to operation of said clutch releasing means for controlling energization of said electrically operating means independently of said energization control by the last said means; and means operable responsive to predetermined vehicle driving speed for controlling energization of said electrically operating means in conjunction with each of said energization controlling means.

6. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electromagnetic means energizable to control operation of said motor; circuit-controlling means operable in response to operation of the engine by reason of the engine being driven by the vehicle, when said ignition control switch is open, for maintaining said electromagnetic means energized; and circuit-controlling means operable in response to operation of said clutch releasing means in disconnecting the engine from the transmission, when said ignition control switch is open, for maintaining said electromagnetic means energized.

7. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electromagnetic means energizable to control operation of said motor; circuit-controlling means operable in response to operation of the engine by reason of the engine being driven by the vehicle, when said ignition control switch is open, for maintaining said electromagnetic means energized; circuit-controlling means operable in response to operation of said clutch releasing means in disconnecting the engine from the transmission, when said ignition control switch is open, for maintaining said electromagnetic means energized; and means operably responsive to predetermined vehicle driving speed for controlling energization of said electromagnetic means in conjunction with each of said circuit-controlling means.

8. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electromagnetic means energizable to control operation of said motor; and electrical circuit-forming means for controlling energization of said electromagnetic means independently of opening and closing of said ignition control switch, comprising, a speed-responsive switch, means for opening and closing the speed-responsive switch in response to predetermined driving speed of the vehicle, and a pair of parallel arranged circuit controlling means respectively operable in response to operation of the engine when driven by the vehicle and in response to operation of said clutch releasing means.

9. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; circuit-controlling means utilizing the partial vacuum in the engine intake for effecting energization of said electrically operating means when said ignition control switch is open and the engine is being driven by the vehicle; and circuit-controlling means operable in response to operation of said clutch releasing means in disconnecting the engine from the transmission for effecting energization of said electrically operating means.

10. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; circuit-controlling means utilizing the partial vacuum in the engine intake for effecting energization of said electrically operating means when said ignition control switch is open and the engine is being driven by the vehicle; and circuit-controlling means operable in response to operation of said clutch releasing means in disconnecting the engine from the transmission for effecting energization of said electrically operating means; and means operably responsive to predetermined vehicle driving speed for controlling energization of said electrically operating means in conjunction with each of said circuit-controlling means.

11. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; electrically operating means for controlling operation of said transmission control means; and electrical circuit-forming means for controlling operation of said electrically operating means independently of opening and closing of said ignition control switch, comprising, a speed-responsive switch, means for opening and closing the speed-responsive switch in response to predetermined driving speed of the vehicle, and a pair of parallel arranged circuit controlling means respectively operated by the partial vacuum in the engine intake and by said clutch releasing means.

12. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a motor operable to control said transmission for step-up and step-down change in the speed ratio drive from the engine to the vehicle; means utilizing the partial vacuum in the engine intake for controlling operation of said transmission control means; electromagnetic means for controlling operation of said vacuum means; means utilizing the partial vacuum in the engine intake for effecting energization of said electromagnetic means when said ignition control switch is open and the engine is being driven by the vehicle; and means operable in response to operation of said clutch releasing means in disconnecting the engine from the transmission for effecting energization of said electromagnetic means.

13. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a vacuum motor operable to control said transmission for step-up and step-down change in the speed ratio drive from the engine to the vehicle; a solenoid; solenoid operated means for controlling operation of said motor; and electrical circuit-forming means for controlling energization of said solenoid independently of opening and closing of said ignition control switch, comprising, a speed responsive switch means for opening and closing the speed-responsive switch in response to predetermined driving speed of the vehicle, and a pair of parallel arranged circuit controlling means respectively operable in response to operation of the engine when driven by the vehicle and in response to operation of said clutch releasing means in disconnecting the engine from the transmission.

14. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a vacuum motor operable to control said transmission for step-up and step-down change in the speed ratio drive from the engine to the vehicle; a solenoid; solenoid operated means for controlling operation of said motor; means operably responsive to drive of the engine by the vehicle for maintaining said solenoid energized as the vehicle is brought to a stop with said ignition control switch open; and means operable in response to operation of said clutch releasing means in disconnecting the engine from the transmission for maintaining said solenoid energized as the vehicle is brought to a stop with said ignition control switch open.

15. In a power transmission for driving a motor vehicle having an engine provided with an ignition system; an ignition control switch adapted when closed to render the ignition system operative and when opened to render the ignition system inoperative; a speed ratio varying transmission; a clutch adapted to operably connect the engine with said transmission; means for releasing said clutch thereby to operably disconnect the engine from said transmission; transmission control means including a vacuum motor operable to control said transmission for step-up and step-down change in the speed ratio drive from the engine to the vehicle; a solenoid; solenoid operated means for controlling operation of said motor; means operably responsive to drive of the engine by the vehicle for maintaining said solenoid energized as the vehicle is brought to a stop with said ignition control switch open; means operable in response to operation of said clutch releasing means in disconnecting the engine from the transmission for maintaining said solenoid energized as the vehicle is brought to a stop with said ignition control switch open; and a governor switch operably responsive to predetermined speed of travel of the vehicle for controlling energization of said solenoid by the last said means and by said engine-drive-responsive means.

16. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a pressure chamber and a piston operable therein by pressure fluid from a first position to a second position thereof; a spring acting to move said piston to its said first position when said chamber is vented; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by pressure fluid and so constructed and arranged as to accommodate pressure fluid operation of said piston in advance of drive-establishing movement of said movable drive control element; valving means for controlling pressure fluid application to and venting of said chamber; latch means operable from a first position of releasably latching said piston operated means in its said first position to a second position accommodating movement of said piston operated means to its said second position; electromagnetic means for controlling operation of said valving means and said latch means; means operably responsive to drive of the engine by the vehicle as the vehicle is brought to a stop for maintaining said electro-magnetic means energized thereby causing said valving means to maintain said chamber vented and to maintain said latch means in its said second position; a clutch adapted to operably connect the engine with said driving structure; means for releasing said clutch thereby to operably disconnect the engine from said driving structure; and means operable in response to operation of said clutch releasing means in disconnecting the engine from said driving structure for maintaining said electro-magnetic means energized independently of energization thereof by said engine-drive-responsive means.

17. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a pressure chamber and a piston operable therein by pressure fluid from a first position to a second position thereof; a spring acting to move said piston to its said first position when said chamber is vented; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by pressure fluid and so constructed and arranged as to accommodate pressure fluid operation of said piston in advance of drive-establishing movement of said movable drive control element; valving means for controlling pressure fluid application to and venting of said chamber; latch means operable from a first position of releasably latching said piston operated means in its said first position to a second position accommodating movement of said piston operated means to its said second position; electro-magnetic means for controlling operation of said valving means and said latch means; means operably responsive to drive of the engine by the vehicle as the vehicle is brought to a stop for maintaining said electro-magnetic means energized thereby causing said valving means to maintain said chamber vented and to maintain said latch means in its said second position; a clutch adapted to operably connect the engine with said driving structure; means for releasing said clutch thereby to operably disconnect the engine from said driving structure; means operable in response to operation of said clutch releasing means in disconnecting the engine from said driving structure for maintaining said electro-magnetic means energized independently of energization thereof by said engine-drive-responsive means; and a governor switch operably responsive to predetermined speed of travel of the vehicle for controlling energization of said electro-magnetic means by the last said means and by said engine-drive-responsive means.

18. In a power transmission for driving a motor vehicle having an engine; a speed ratio varying transmission; a clutch operably connecting the engine with said transmission; means for releasing said clutch; transmission control means operable to control said transmission for step-up and step-down change in the speed ratio drive from the engine to the vehicle, said control means including positively engageable drive control elements adapted when engaged to provide said step-up and when disengaged to accommodate said step-down; electrically operated means for controlling operation of said transmission control means and adapted when energized to maintain said drive control elements disengaged; and means responsive to operation of said clutch releasing means in operably disconnecting the engine from the transmission for maintaining said electrically operated means electrically energized as the vehicle is brought to a stop with said clutch released.

19. In a motor vehicle power transmission having an engine provided with an ignition system; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; means for selectively establishing either an operative or an inoperative thrust-transmitting relationship between said leader and follower portions; thrust-applying means for said leader member operable, when said operative thrust-transmitting relationship is established, to cause thrust of said follower member so as to shift said shiftable element out of said engagement; means operable in response to establishment of said inoperative thrust-transmitting relationship for effecting said engaging shift of said shiftable element; means operable to retract said leader member in lost motion relationship with respect to said follower member such that said thrust-applying means will move said leader member relative to said follower member in taking up said lost motion until said thrust-transmitting relationship is established; means for rendering the engine ignition system inoperative in response to said movement of said leader member relative to said follower member; an ignition control switch adapted for manipulation by the vehicle driver such that when said switch is closed the engine ignition system is rendered operative and when opened the engine ignition system is rendered inoperative; a clutch operably connecting the engine with said driving structure; means for releasing said clutch thereby to operably disconnect the engine from said driving structure; and means operable in response to operation of said clutch releasing means, when said ignition control switch is open, for causing said selectively-establishing means to establish said operative thrust-transmitting relationship such that on bringing the vehicle to a stop with said clutch released said shiftable element will be maintained out of said engagement.

TENO IAVELLI.